United States Patent [19]
Kobayashi et al.

[11] Patent Number: 5,901,815
[45] Date of Patent: May 11, 1999

[54] DISK BRAKE

[75] Inventors: Kinzo Kobayashi; Sinji Suzuki; Takahiro Tokunaga, all of Yamanashi-ken, Japan

[73] Assignee: Tokico Ltd., Kawasaki, Japan

[21] Appl. No.: 08/969,747

[22] Filed: Nov. 13, 1997

Related U.S. Application Data

[63] Continuation of application No. 08/604,157, Feb. 20, 1996, abandoned.

[30]  Foreign Application Priority Data

Feb. 20, 1995 [JP] Japan ................................. 7-055055

[51] Int. Cl.⁶ ............................................. F16D 65/40
[52] U.S. Cl. ...................... 188/7; 188/73.36; 188/205 A
[58] Field of Search ......................... 188/72.3, 73.31, 188/73.35, 73.36, 73.37, 73.38, 73.39, 205 A, 206 R

[56] References Cited

U.S. PATENT DOCUMENTS

| | | | |
|---|---|---|---|
| 4,134,477 | 1/1979 | Asquith | 188/73.38 |
| 4,245,723 | 1/1981 | Moriya | 188/72.3 |
| 4,607,728 | 8/1986 | Kobayashi | 188/73.38 |
| 5,472,067 | 12/1995 | Fujiwara | 188/73.36 |
| 5,649,610 | 7/1997 | Shimazaki et al. | 188/73.38 |

*Primary Examiner*—Matthew C. Graham
*Assistant Examiner*—Pamela J. Lipka
*Attorney, Agent, or Firm*—Wenderoth, Lind & Ponack, L.L.P.

[57]  ABSTRACT

A disk brake includes a carrier secured to a fixed part of a vehicle, a rotor fixed to a vehicle wheel, a caliper slidably mounted to the carrier, a pair of inboard and outboard pad assemblies for operative braking coaction with the rotor, and a pair of pad springs adapted to slidably support the inboard and outboard pad assemblies. The carrier includes an inboard member, an outboard member, and a pair of opposite side members each having a pair of opposite guide grooves. The pad springs each include a bridge portion, and a pair of legs depending from opposite ends of the bridge portion. The legs each include a pair of pad guides fit into the guide grooves.

20 Claims, 10 Drawing Sheets

DISK BRAKE

This application is a continuation of now abandoned application, Ser. No. 08/604,157, filed Feb. 20, 1996, now abandoned.

BACKGROUND OF THE INVENTION

1. Field of the Invention

The present invention relates to a disk brake and more particularly, to a pad spring mounted to a carrier and adapted to slidably support a pair of inboard and outboard pad assemblies.

2. Description of the Related Art

Figure 17:
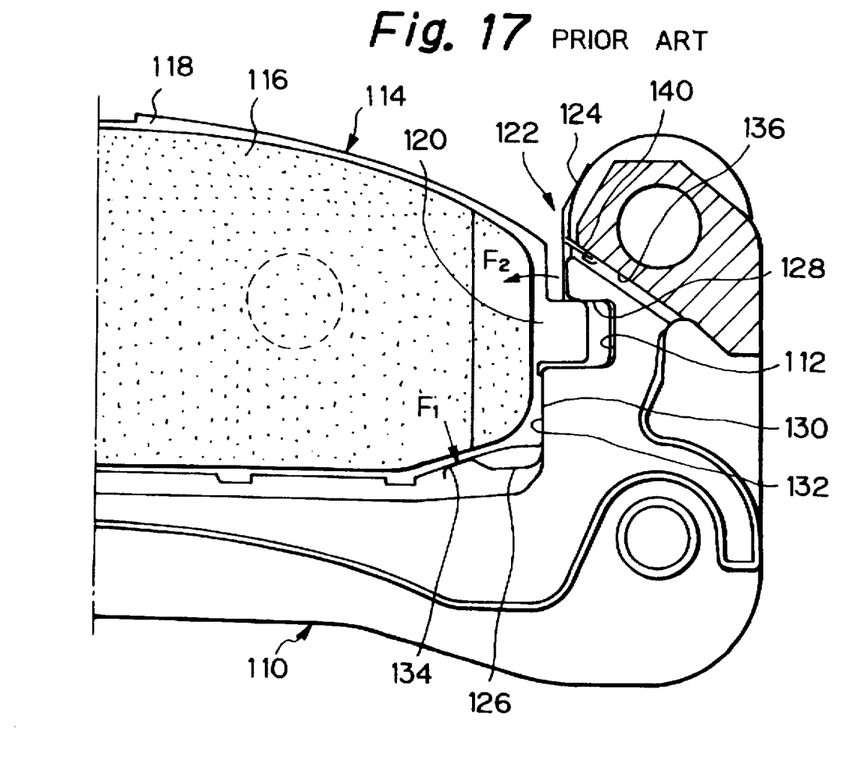
FIG. 17 is a partial sectional view of a conventional disk brake.

Referring first to FIG. 17, a conventional disk brake includes a carrier 110 secured to a fixed part of the vehicle and adapted to support a floating or sliding caliper (not shown). The carrier 110 has a pair of opposite guide grooves 112. An inboard pad assembly 114 is composed of a liner 116, and a backing plate 118 attached to the brake liner 116. The backing plate 118 has a pair of opposite lugs 120 which are received within the corresponding guide grooves 112 through a corresponding pair of pad springs 122. The pad springs 122 are adapted to axially guide the inboard pad assembly 114. Each of the pad springs 122 includes a bridge portion 124, and a pair of legs 126 extending downwardly from opposite ends of the bridge portion 124. The legs 126 generally include a pair of substantially C-shaped pad guides 128 fit within the corresponding guide grooves 112 and designed to reduce friction between the inboard pad assembly 114 and the carrier 110, torque bearing surfaces 130 extending vertically and downwardly from the pad guides 128 and engaged on bearing surfaces 132 of the carrier 110, and pad rests 134 extending outwardly and horizontally from the torque bearing surfaces 130 and adapted to support the inboard pad assembly 114. The carrier 110 has a pair of ramp surfaces 136 which span a rotor or disk (not shown). A pair of locking tabs 140 extend from the upper portion of the legs 126 and are engaged with the ramp surfaces 136 of the carrier 110 when the pad spring 122 is mounted to the carrier 110.

A problem associated with such a pad spring is that the torque bearing surfaces 130 of the pad spring 122 tend to be separated from the bearing surfaces 132 of the carrier 110 since the locking tabs 140 cause rearward inclination of the pad spring 122. This makes it difficult to subsequently mount the inboard pad assembly 114 to the carrier 110. Also, when the pad spring 122 is attached to the carrier 110, a force F1 is produced to cause the pad spring 122 to be rotated in a direction toward the inboard pad assembly 114. The resulting moment or force F2 causes the pad spring 122 to be moved away from the carrier 110. The direction of the force F2 is substantially identical to the ramp surfaces 136 of the carrier 110. The pad spring 122 thus tends to be inclined in a forward direction or moved in a direction away from the carrier 110. This deteriorates sliding of the inboard pad assembly 114 and increases friction between the inboard pad assembly 114 and the carrier 110. An increase in drag, which occurs when the pad assembly 114 is returned to its home position after braking action, results in a decrease in fuel economy of the vehicle.

Accordingly, it is an object of the present invention to provide a disk brake which insures close contact of a pair of pad springs to a carrier and facilitates mounting of a pair of friction pads to the carrier.

It is another object of the present invention to provide a pad spring which enhances sliding of the friction pads and reduces friction between the friction pads and the carrier.

SUMMARY OF THE INVENTION

According to one aspect of the present invention, there is provided a disk brake comprising a carrier adapted to be secured to a fixed part of a vehicle, a rotor fixed to a vehicle wheel, a caliper slidably mounted to the carrier and shaped to straddle the rotor, a pair of inboard and outboard pad assemblies mounted to the caliper and adapted for operative braking coaction with the rotor, and a pair of pad springs adapted to slidably support the inboard and outboard pad assemblies. The carrier includes an inboard member, an outboard member, and a pair of opposite side members extending between the inboard and outboard members. The side members each have a pair of opposite guide grooves and a corresponding pair of opposite rotor spanning walls extending from the guide grooves and shaped to straddle the rotor. Also the pad springs each include a bridge portion extending along the side members, and a pair of legs depending from opposite ends of the bridge portion. The pair of legs include a pair of pad guides fit into the guide grooves, and a pair of pad rests on which the inboard and outboard pad assemblies are seated. The pair of pad guides include a pair of locking tongues engaged within the guide grooves to hold the pad springs in position.

The side members of the carrier preferably include recesses defined adjacent to the guide grooves. The free ends of the locking tongues are lockingly engaged within the recesses. The pad spring preferably includes a pair of retaining tabs which extend from the legs in a direction away from the inboard and outboard pad assemblies. The retaining tabs are urged against the rotor spanning walls to limit axial displacement of the pad spring. The rotor spanning walls have respective notches adjacent to the guide grooves so that the retaining tabs may be bent with a relatively large radius of curvature.

According to another aspect of the present invention, there is provided a pad spring for use with a disk brake which includes a carrier, a rotor fixed to a vehicle wheel, a caliper slidably mounted to the carrier and shaped to straddle the rotor, and a pair of inboard and outboard pad assemblies mounted to the caliper and adapted for operative braking coaction with the rotor. The carrier includes a pair of opposite side members extending along the axis of the rotor, and each side member has a pair of guide grooves. The pad spring includes a bridge portion extending along the side members, and a pair of legs extending from opposite ends of the bridge portion. The legs each include a pair of pad guides fit within the guide grooves, and locking tongues or pawls lockingly engaged within the guide grooves.

The above and other objects, features and advantages of the present invention will become apparent from the following detailed description of preferred embodiments when taken in conjunction with the accompanying drawings.

3

DESCRIPTION OF THE PREFERRED EMBODIMENTS

Figure 1:
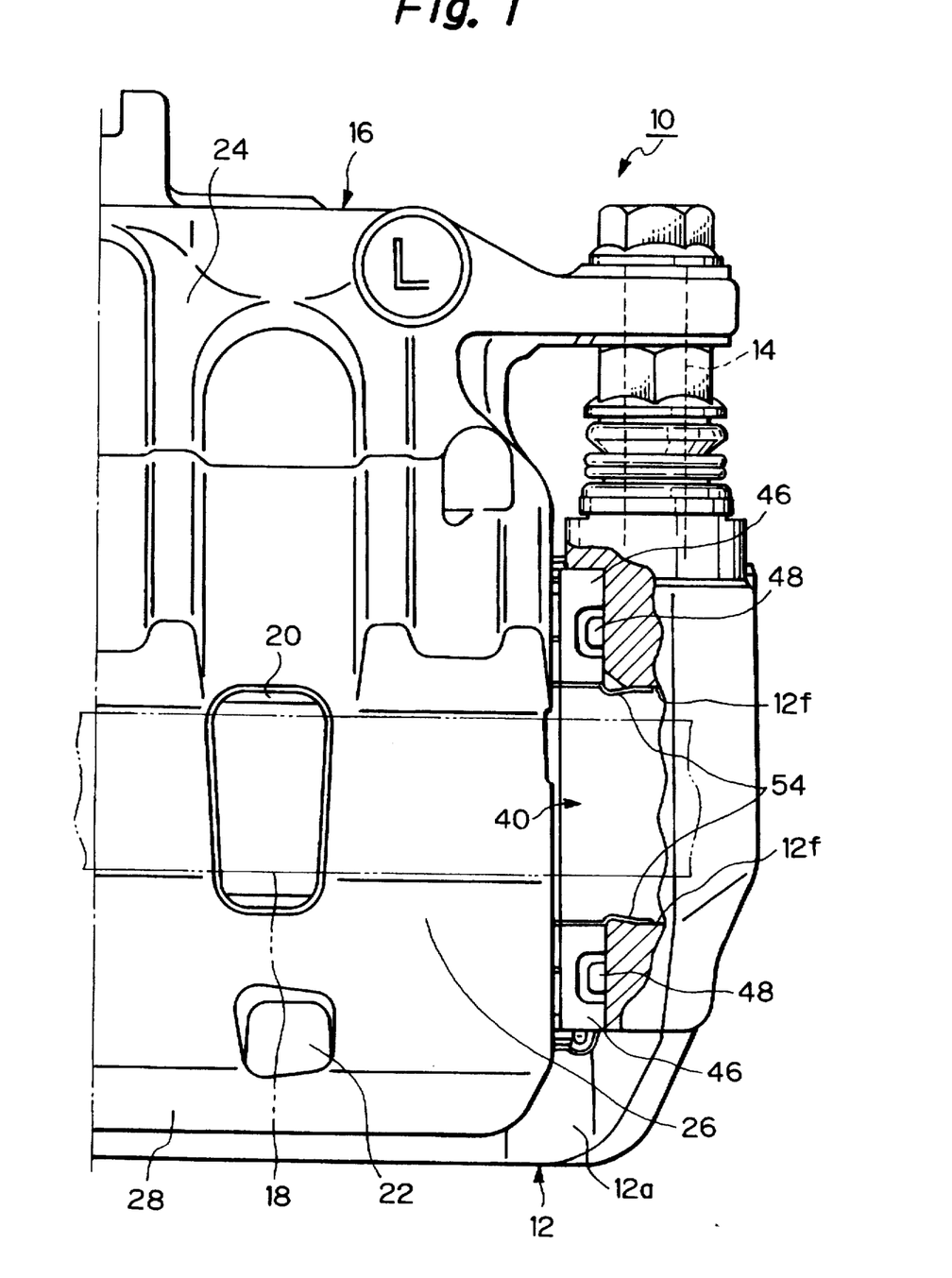
FIG. 1 is a partial plan view, partly in section, of a disk brake according to one embodiment of the present invention.
Figure 2:
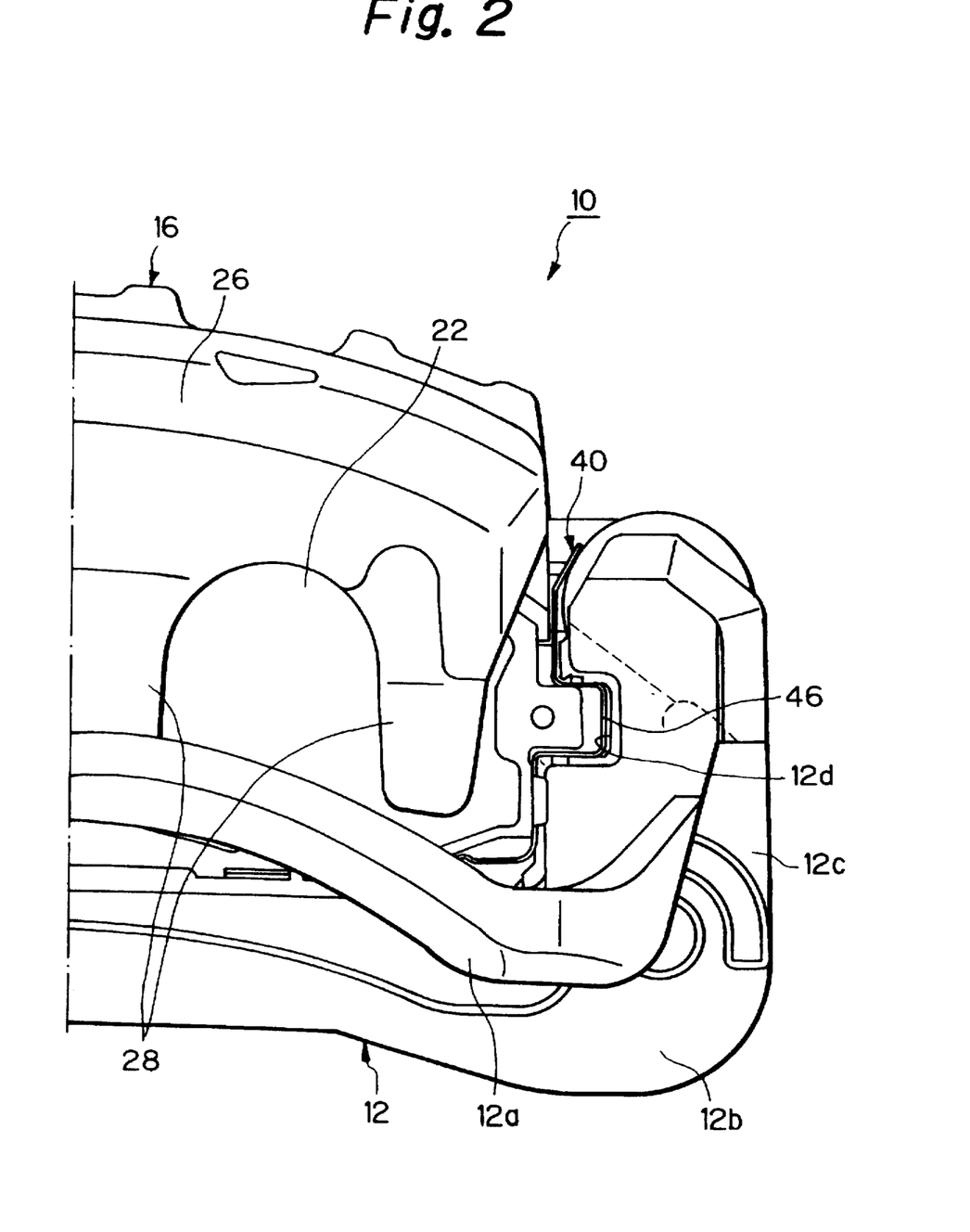
FIG. 2 is a partial front view of the disk brake shown in FIG. 1.

Referring now to FIGS. 1 and 2, there is shown a disk brake made according to one embodiment of the present invention and generally designated by the reference numeral 10. The disk brake 10 generally includes a carrier 12 secured to a fixed part of the vehicle and including a pair of axial pins 14 (only one is shown in FIG. 1), a caliper 16 slidably supported on the pins 14, a disk or rotor 18 secured to a vehicle wheel (not shown), and a pair of inboard and outboard brake pad assemblies 20 and 22 for operative braking coaction with the rotor 18.

The carrier 12 is made of cast iron and includes an inboard member 12a, an outboard member 12b, and a pair of side members 12c (only one is shown) extending between the inboard member 12a and the outboard member 12b. The caliper 16 is also made of cast iron and has a generally C-shaped housing 24. The housing 24 has a bridge portion 26 shaped to straddle the rotor 18, and a plurality of outboard legs 28 depending from the outboard end of the bridge portion 26. A cylinder (not shown) is defined in the caliper housing 24 to slidably receive a piston (not shown).

Figure 3:
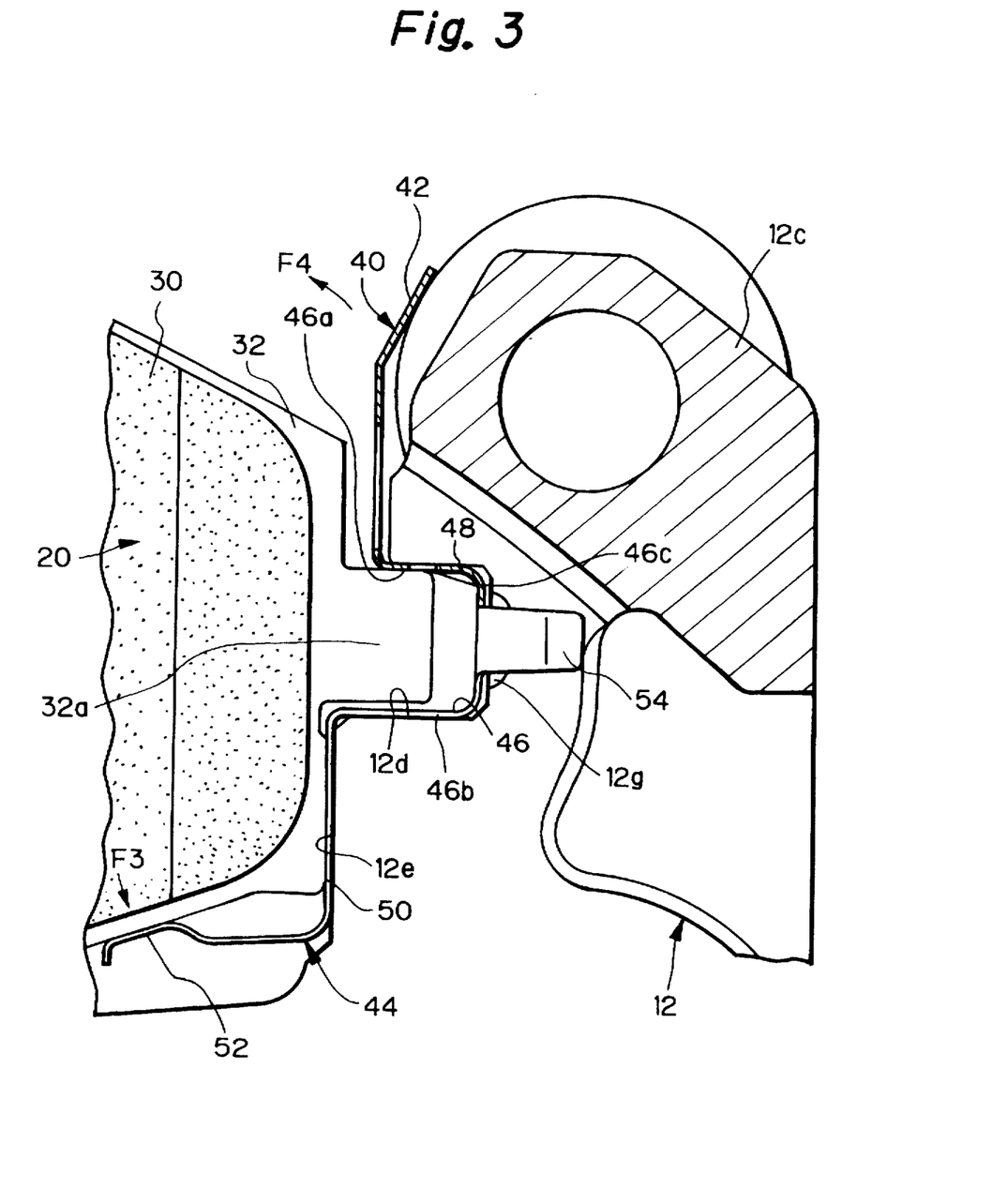
FIG. 3 is a sectional view, on an enlarged scale, showing the principal part of the disk brake shown in FIG. 1.

As shown in FIG. 3, the inboard pad assembly 20 is composed of a brake liner 30 and a backing plate 32 bonded or otherwise secured to the brake liner 30. The inboard pad assembly 20 is mounted on the outer end of the caliper piston. The outboard pad assembly 22 is a mirror image of the inboard pad assembly 20 and suitably mounted on the outboard legs 26 of the caliper 16. When hydraulic fluid is forced into the cylinder of the caliper 16, the inboard pad assembly 20 is urged into frictional engagement with the inboard side of the rotor 18. The caliper 16 is then caused to axially slide on the pins 14 of the carrier 12. As a result, an inwardly directed force is applied to the outboard backing plate to thereby urge the outboard pad assembly 22 into frictional engagement with the outboard side of the rotor 18 for braking action. The caliper 16 serves as a means for applying the necessary clamping forces to the brake pad assemblies 20 and 22.

Referring to FIGS. 3 to 7, a pair of pad springs 40 (only one is shown) are attached to the inner sides of the side members 12c, 12c and adapted to support the inboard and outboard pad assemblies 20 and 22. The pad spring 40 is generally inverted U-shaped and includes a bridge portion 42, and a pair of opposite legs 44, 44 depending from opposite ends of the bridge portion 42. The legs 44 are centrally bent to form a pair of generally C-shaped pad guides 46, respectively. The pad guide 46 is defined by a top wall 46a, a bottom wall 46b and a vertical wall 46c extending between the top wall 46a and the bottom wall 46b.

4

An opening 46d is defined between the top wall 46a and vertical wall 46c. A locking means 48 is in the form of a tongue or pawl. The locking tongue 48 extends from the vertical wall 46c of the pad guide 46 and is slightly rearwardly inclined relative to the vertical wall 46c. The free end of the locking tongue 48 extends slightly beyond the top wall 46a of the pad guide 46 and is bent forwards. A bearing surface 50 extends downwardly from the bottom wall 46b of each of the pad guides 46. A pad rest 52 extends horizontally and forwardly from the lower end of the bearing surface 48 and supports the bottom of the backing plate 32.

The rear side member 12c of the carrier 12 has a pair of guide grooves 12d, 12d adapted to receive the pad guides 46, 46 of the legs 44, 44, and a pair of torque bearing surfaces 12e extending downwardly from the guide grooves 12d, 12d adapted to engage with the bearing surfaces 50, 50 of the legs 44, 44, respectively. When the pad spring 40 is attached to the side member 12c of the carrier 12, the pad guides 46, 46 are closely fit within the corresponding guide grooves 12d, 12d. At this time, the locking tongues 48, 48 are pressed into contact with the upper walls of the guide grooves 12d, 12d, respectively. The locking tongues 48, 48 are then resiliently deformed to thereby bring the entire bottom walls 46b, 46b of the pad guides 46, 46 into close contact with the bottom surfaces of the guide grooves 12d, 12d. Also, the bearing surfaces 50, 50 of the legs 44, 44 are brought into close contact with the bearing surfaces 12e of the side member 12c. This facilitates subsequent mounting of the inboard brake pad assembly 20 to the carrier 12 through the pad springs 40.

Figure 4:
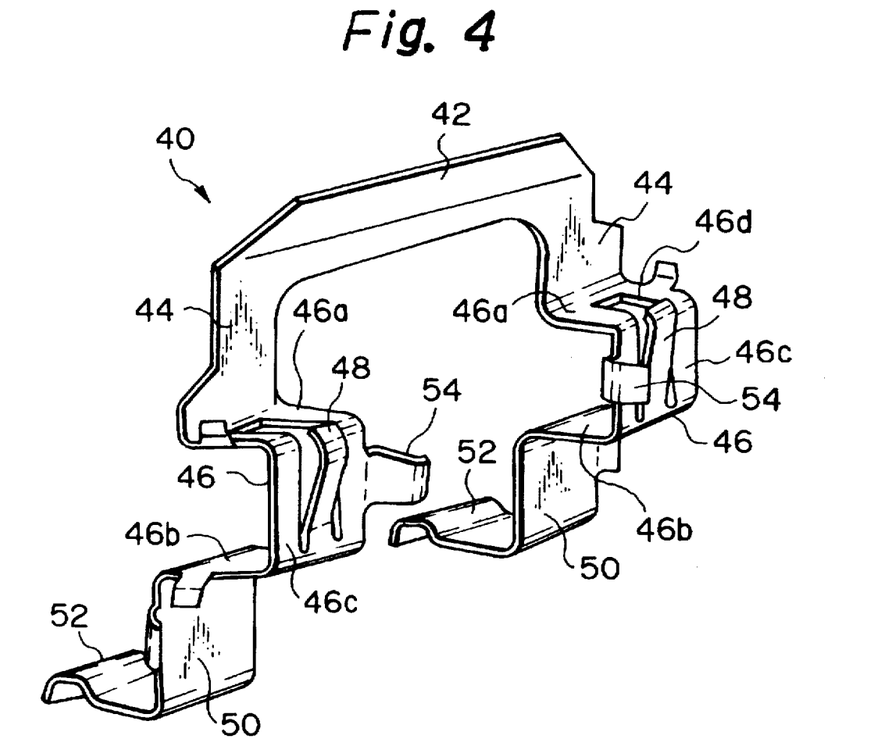
FIG. 4 is a perspective view of a pad spring shown in FIG. 3.
Figure 5:
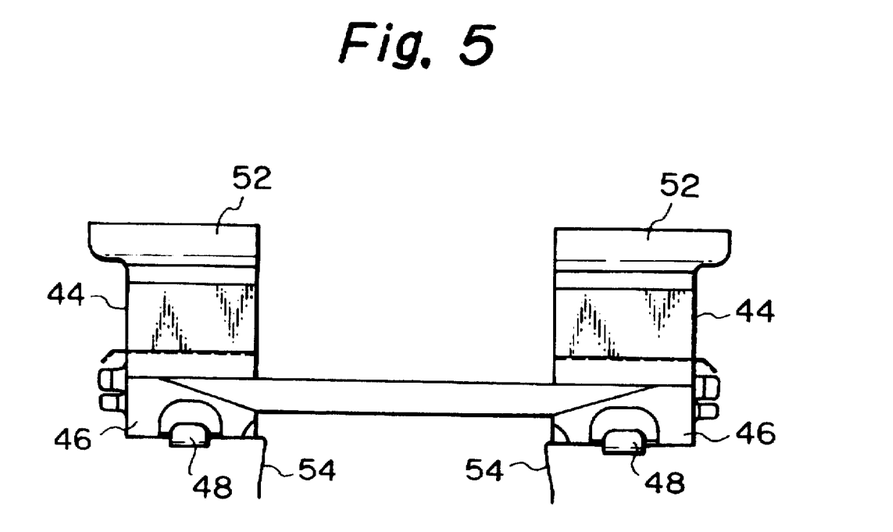
FIG. 5 is a top plan view of the pad spring shown in FIG. 4.
Figure 6:
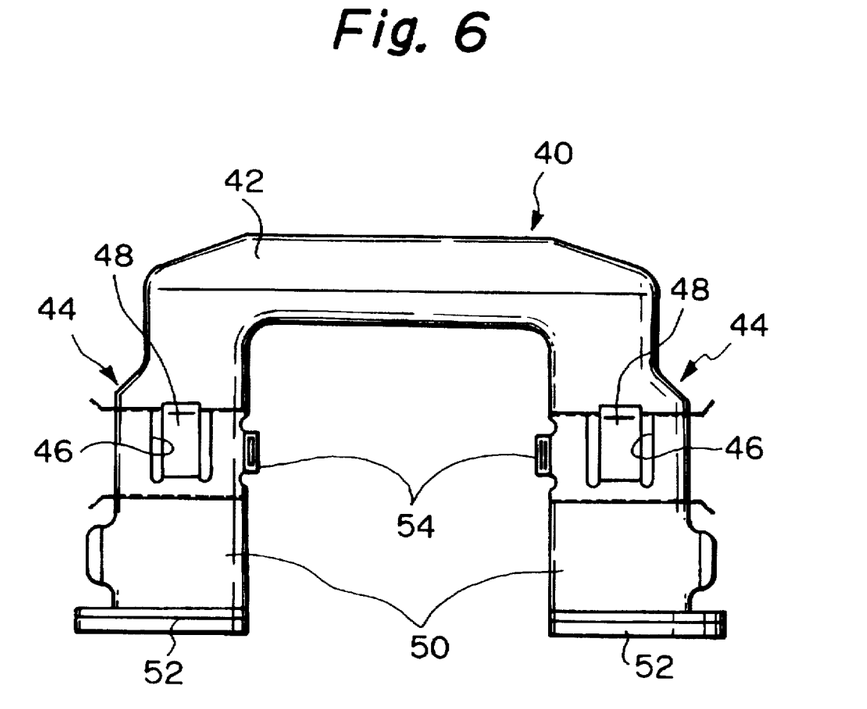
FIG. 6 is a rear view of the pad spring shown in FIG. 4.
Figure 7:
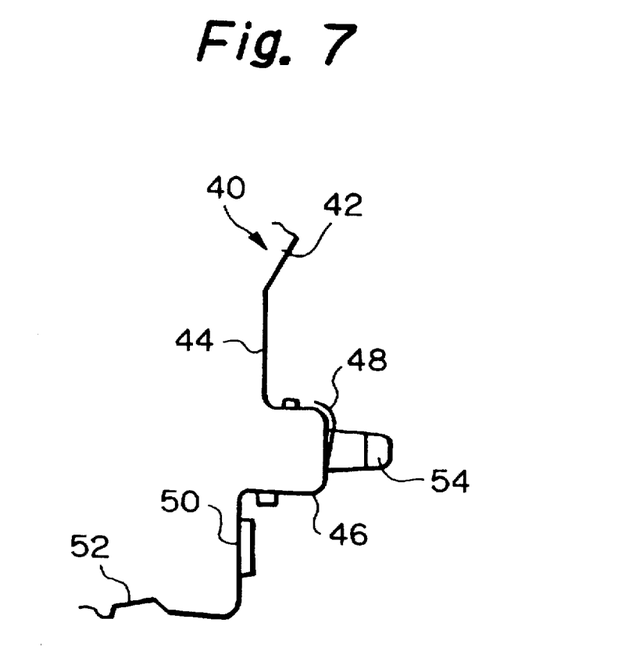
FIG. 7 is a sectional view of the pad spring shown in FIG. 4.
Figure 8:
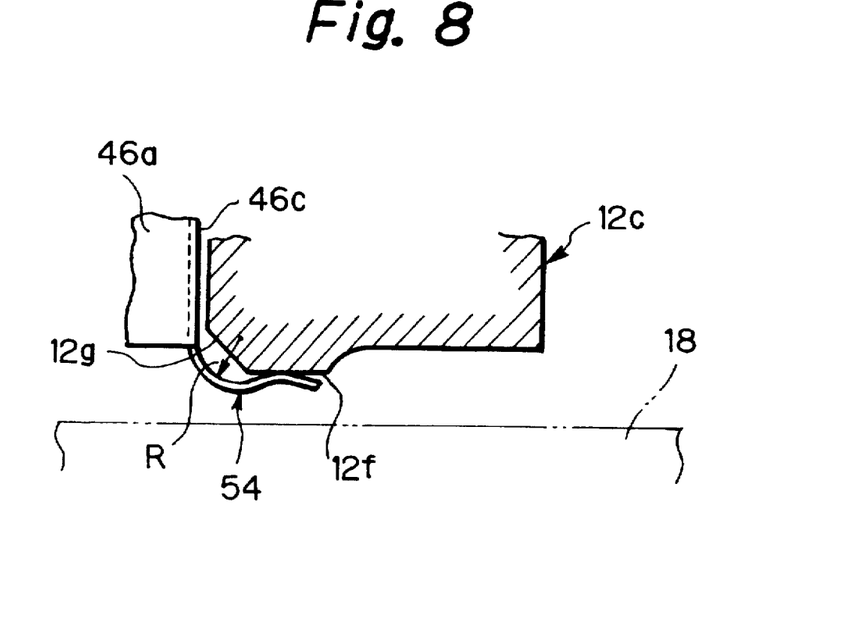
FIG. 8 is a sectional view showing the manner in which a retaining tab is engaged with a carrier.

As shown better in FIGS. 4 and 8, a pair of stoppers or retaining tabs 54, 54 project rearwardly from the vertical walls 46c, 46c of the pad guides 46, 46 and are bent to a generally S-shape. When the pad guides 46, 46 are fit within the guide grooves 12d, 12d, the retaining tabs 54, 54 are urged against a pair of rotor spanning walls 12f of the side member 12c as shown best in FIG. 8. The retaining tabs 54, 54 thus serve to hold the pad spring 40 in position and limit axial displacement of the pad spring 40 toward the rotor 18.

Figure 9:
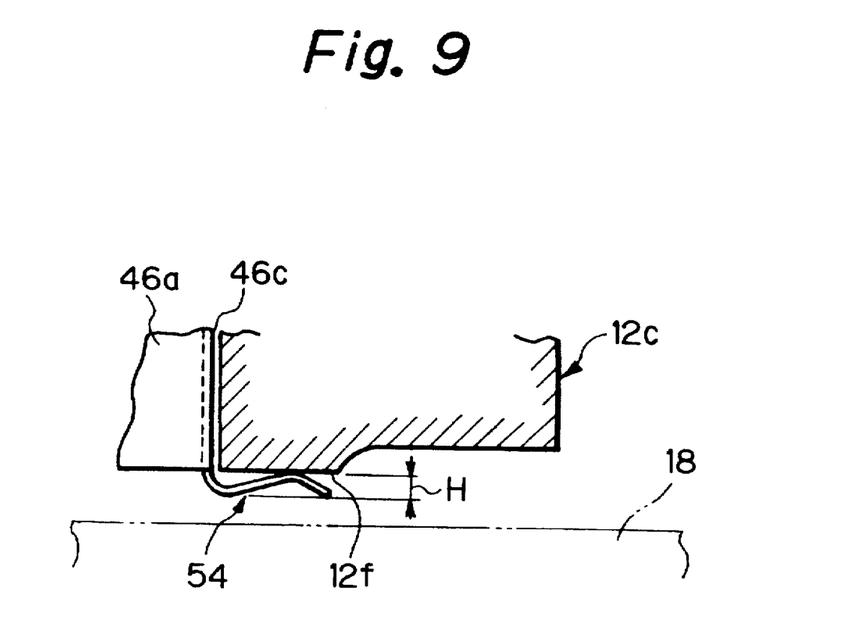
FIG. 9 is a view similar to FIG. 8, but showing a modified form of the retaining tab shown in FIG. 8.

As shown in FIGS. 3 and 8, a pair of notches 12g, 12g are formed in the corresponding rotor spanning walls 12f, 12f. This configuration allows the retaining tabs 54, 54 to be bent with a relatively large radius of curvature R without interfering with the rotor 18. The notches 12g, 12g may be formed by machining, but preferably by molding for better economy. The notches 12g may not necessarily be formed in the rotor spanning walls 12f, 12f. In not formed, the retaining tabs should have a height H so that they do not interfere with the rotor 18 as shown in FIG. 9.

The backing plate 32 has a pair of opposite lugs 32a, 32a. When the inboard pad assembly 20 is mounted to the carrier 12, the lugs 32a, 32a are fit into the pad guides 46, 46. At this time, a force F3 is exerted on the pad rests 52, 52. As a result, a force F4 could be produced so as to cause the pad spring 40 to be separated from the side member 12c of the carrier 12. However, the locking tongues or pawls 48, 48 which are pressed against the inner walls of the guide grooves 12d, 12d resist this force F4 and effectively prevent forward inclination of the pad spring 40. As such, the lugs 32a, 32a are uniformly contacted with the top walls 46a, 46a of the pad guides 46, 46. This enhances sliding of the pad assembly 20 and reduces friction between the pad assembly 20 and the carrier 12. No drag results when the pad assembly 20 is returned to its home position after braking action.

Figure 10:
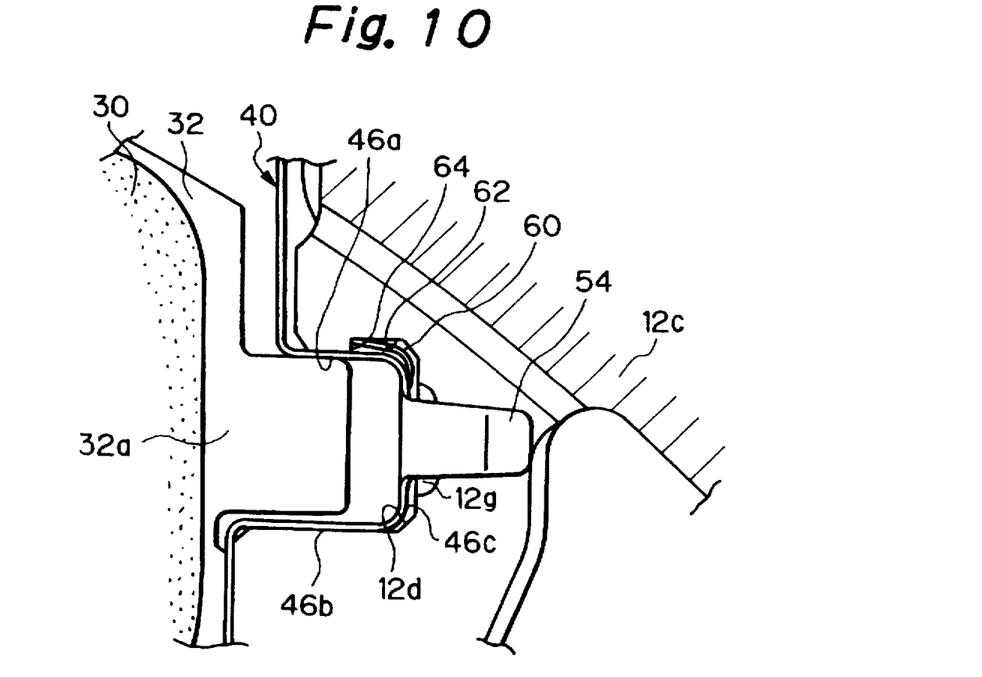
FIG. 10 is a partial sectional view of a disk brake according to another embodiment of the present invention.

FIG. 10 shows a disk brake according to another embodiment of the present invention. Like parts are given like reference numerals and will not be described herein.

As shown in FIG. 10, a locking tongue 60 extends along part of the upper wall 46a of the pad guide 46 and is longer than the locking tongue 48. A recess 62 is defined in the side member 12c adjacent to the guide groove 12d to receive part of the locking tongue 48. A step 64 is formed in the inner wall of the recess 62. The free end of the locking tongue 60 is engaged with the step 64 to more firmly hold the pad spring 40 in position and prevent forward inclination of the pad spring 40.

Figure 11:
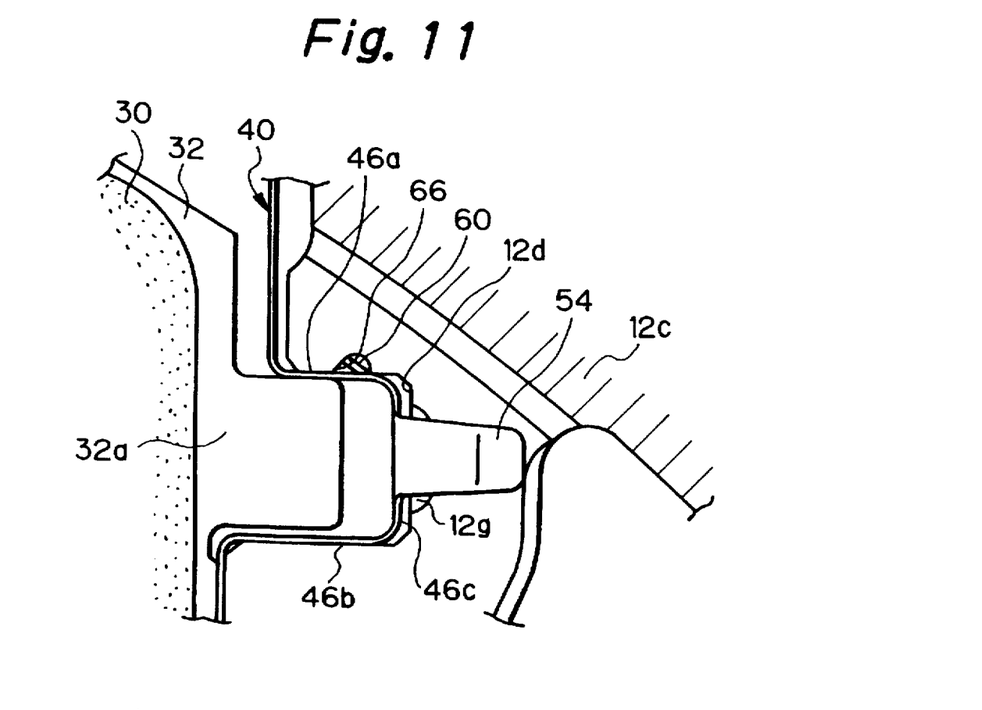
FIGS. 11 and 12 are views similar to FIG. 10, but showing modified forms of the locking tongue.
Figure 12:
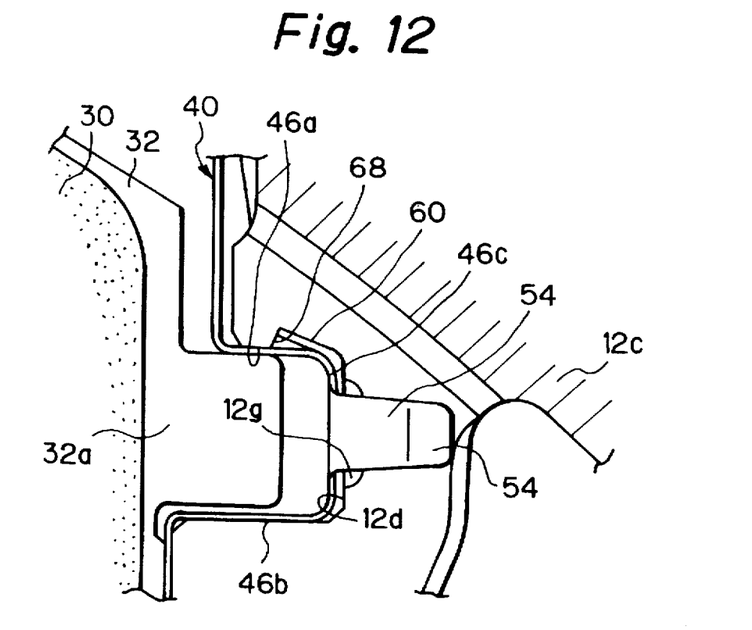

FIGS. 11 and 12 show alternative embodiments of the present invention. In FIG. 11, a recess 66 is defined in the side member 12c adjacent to the guide groove 12d and has a semicircular section. The free end of the locking tongue 60 is engaged with the round inner wall of the recess 66. In FIG. 12, a recess 68 is defined in the side member 12c adjacent to the guide groove 12d and has a substantially V-shaped section. The free end of the locking tongue 60 is engaged with one wall of the recess 66.

Figure 13:
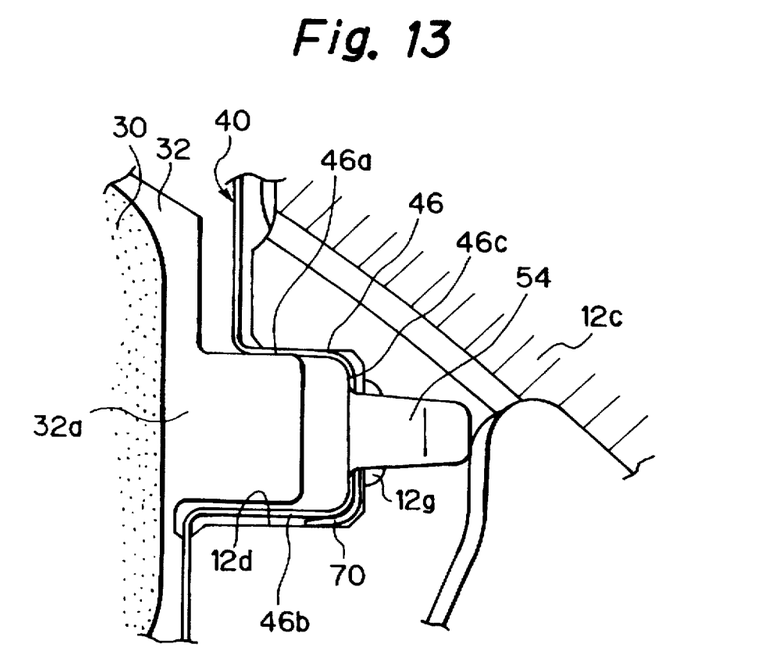
FIGS. 13 to 16 are partial sectional views of alternative embodiments of the present invention.

FIG. 13 shows a disk brake according to a further embodiment of the present invention. Also, like parts are given like reference numerals and will not be described herein. As shown in FIG. 13, a locking tongue 70 extends downwardly from the vertical or rear wall 46c of the pad guide 46 and is engaged with the bottom wall 46b of the pad guide 46.

Figure 14:
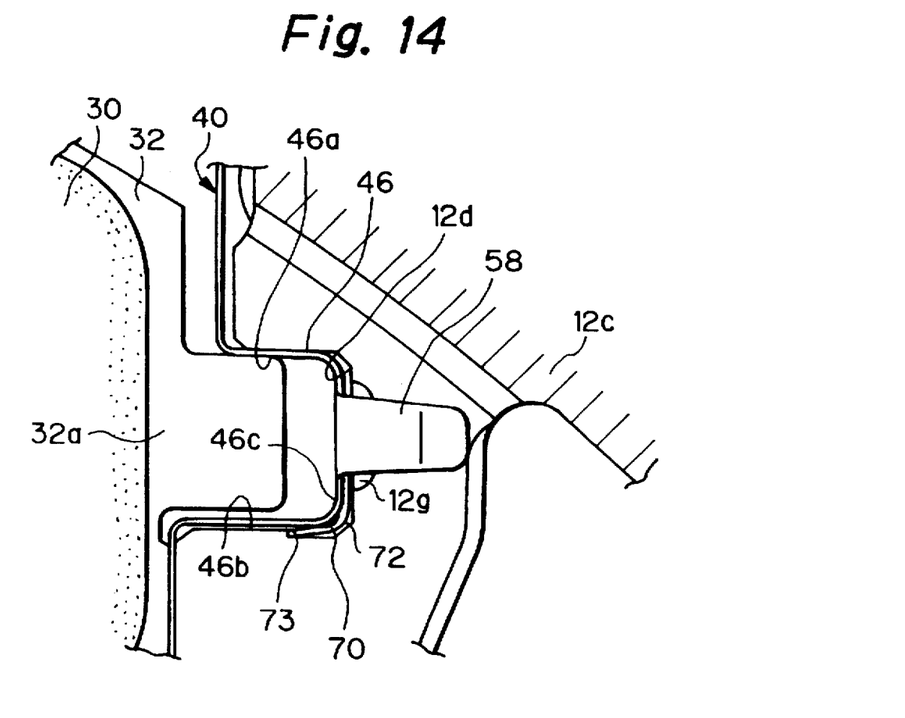
Figure 15:
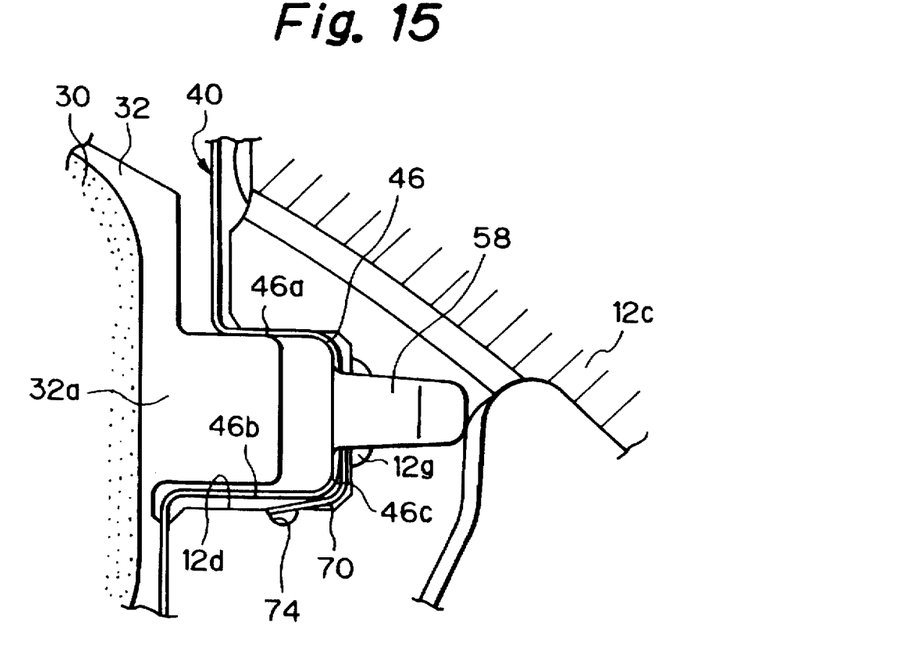
Figure 16:
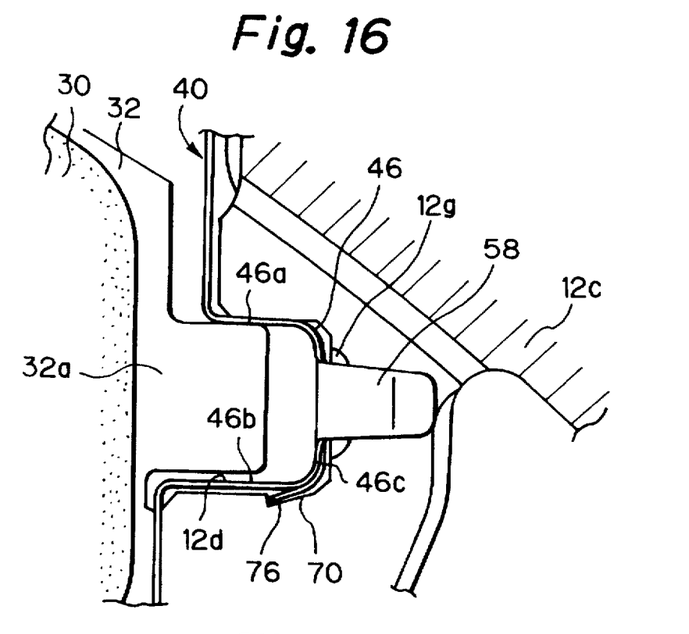

FIGS. 14 to 16 show alternative embodiments of the present invention. Like parts are given like reference numerals and will not be described herein. Referring to FIG. 14, a recess 72 is defined in the side member 12c adjacent to the guide groove 12d to receive the free end of the locking tongue 70. A step 73 is formed in the inner wall of the recess 72. The free end of the locking tongue 70 is engaged with the step 73. Referring to FIG. 15, a recess 74 is defined in the side member 12c adjacent to the guide groove 12d and has a semicircular section. The free end of the locking tongue 70 is engaged with the round inner wall of the recess 74. In FIG. 16, a recess 76 is defined in the side member 12d adjacent to the guide groove 12d and has a substantially V-shaped section. The free end of the locking tongue 70 is engaged with one wall of the recess 76.

The present invention has been described with respect to its preferred embodiments. It will be understood that various modifications and changes may be made without departing from the spirit and scope of the invention as defined by the appended claims.

What is claimed is:

1. A disk brake comprising:

a carrier adapted to be secured to a fixed part of a vehicle;

a rotor adapted to be fixed to a vehicle wheel;

a caliper slidably mounted to said carrier and shaped to straddle said rotor;

a pair of inboard and outboard pad assemblies adapted for operative braking coaction with said rotor; and a pair of pad springs adapted to slidably support said inboard and outboard pad assemblies;

said carrier including an inboard member, an outboard member, and a pair of opposite side members extending between said inboard and outboard members, respectively, said pair of side members each having a pair of opposite guide grooves, a corresponding pair of recesses defined adjacent to said pair of guide grooves, and a pair of opposite rotor spanning walls extending from said pair of guide grooves and shaped to straddle said rotor;

each of said pair of pad springs including a bridge portion extending along a corresponding one of said pair of side members, and a pair of legs depending from opposite ends of said bridge portion, said pair of legs including a pair of pad guides fit into said guide grooves of said carrier, and a pair of pad rests on which said inboard and outboard pad assemblies are seated, said pair of pad guides including a pair of locking tongues having free ends lockingly engaged within said pair of recesses so as to hold the pad spring in position.

2. The disk brake according to claim 1, wherein each of said pad springs includes a pair of retaining tabs, said pair of retaining tabs extending from said pair of legs in a direction away from said inboard and outboard pad assemblies and urged against said rotor spanning walls so as to limit axial displacement of said pair of pad springs.

3. The disk brake according to claim 2, wherein said rotor spanning walls have respective notches formed adjacent to said guide grooves so that said retaining tabs may be bent with a relatively large radius of curvature.

4. A pad spring adapted for use with a disk brake including a carrier secured to a fixed part of a vehicle, a rotor fixed to a vehicle wheel, a caliper slidably mounted to the carrier and shaped to straddle the rotor, and a pair of inboard and outboard pad assemblies adapted for operative braking coaction with the rotor, said carrier including an inboard member, an outboard member, and a pair of opposite side members extending between said inboard and outboard members and each having a pair of guide grooves, said pad spring comprising:

a bridge portion extending along a corresponding one of the side members of the carrier and having opposite ends; and a pair of legs depending from said opposite ends of said bridge portion and including a pair of pad guides adapted to be fit within the pair of guide grooves of the one side member and having a pair of locking tongues, said locking tongues having free ends which are lockingly engageable within a pair of recesses formed in the one side member adjacent to said pair of guide grooves.

5. A disk brake comprising:

a carrier adapted to be secured to a fixed part of a vehicle;

a rotor adapted to be fixed to a vehicle wheel;

a caliper slidably mounted to said carrier and shaped to straddle said rotor;

a pair of inboard and outboard pad assemblies adapted for operative braking coaction with said rotor; and a pair of pad springs adapted to slidably support said inboard and outboard pad assemblies, said carrier including an inboard member, an outboard member, and a pair of opposite side members extending between said inboard and outboard members, each of said side members having a pair of opposite guide grooves, and a pair of opposite rotor spanning walls extending from said pair of guide grooves and shaped to straddle said rotor, each of said pair of guide grooves having a substantially C-shaped section, each of said pair of pad springs comprising at least one spring member including a pad guide having a substantially C-shaped section and received in one of said guide grooves of one of said side members, said pad guide having a top wall, a bottom wall and a substantially vertical wall extending between said top and bottom walls and including a locking member extending from said vertical wall and terminating above said top wall, said locking member being shaped so as to engage within a corresponding one of said pair of guide grooves.

6. The disk brake according to claim 5, wherein said locking member has a proximal end located at said vertical wall adjacent to said bottom wall of said pad guide, and a distal end located above said top wall, said locking member being generally outwardly curved from said proximal end toward said distal end so as to develop a bias in a direction substantially radially of said rotor.

7. A disk brake comprising:

a carrier adapted to be secured to a fixed part of a vehicle;

a rotor adapted to be fixed to a vehicle wheel;

a caliper slidably mounted to said carrier and shaped to straddle said rotor;

a pair of inboard and outboard pad assemblies adapted for operative braking coaction with said rotor; and a pair of pad springs adapted to slidably support said inboard and outboard pad assemblies, said carrier including an inboard member, an outboard member, and a pair of opposite side members extending between said inboard and outboard members, each of said pair of side members having a pair of opposite guide grooves, and a pair of opposite rotor spanning walls extending from said pair of guide grooves and shaped to straddle said rotor, each of said guide grooves having a substantially C-shaped section, said pair of pad springs each comprising at least one spring member including a pad guide having a substantially C-shaped section and received in one of said guide grooves of one of said side members, said pad guide having a top wall, a bottom wall and a substantially vertical wall extending between said top and bottom walls and including a locking member extending from said vertical wall and terminating below said bottom wall of said pad guide, said locking member being shaped so as to engage within a corresponding one of said guide grooves.

8. The disk brake according to claim 7, wherein said locking member has a proximal end located at said vertical wall of said pad guide, and a distal end located below said bottom wall, said locking member being generally outwardly curved from said proximal end toward said distal end so as to develop a bias in a direction substantially radially of said rotor.

9. A pad spring adapted for use with a disk brake including a carrier secured to a fixed part of a vehicle, a rotor fixed to a vehicle wheel and having an axis, a caliper slidably mounted to the carrier and shaped to straddle the rotor, and a pair of inboard and outboard pad assemblies adapted for operative braking coaction with the rotor, the carrier including a pair of opposite side members extending along the axis of the rotor and each having a pair of guide grooves, said pad spring comprising:

at least one spring member including a pad guide adapted to be received in one of the pair of guide grooves of one of the side members, said pad guide having a top wall, bottom wall and a substantially vertical wall extending between said top and bottom walls, said pad guide further including a locking member extending from said vertical wall and terminating above said top wall, said locking member being so shaped as to be lockingly engageable within one of the guide grooves.

10. The pad spring according to claim 9, wherein said locking member has a proximal end located at said vertical wall adjacent to said bottom wall, and a distal end located above said top wall, said locking member being generally outwardly curved from said proximal end toward said distal end so as to develop a bias in a direction substantially radially of the rotor.

11. A pad spring adapted for use with a disk brake including a carrier secured to a fixed part of a vehicle, a rotor fixed to a vehicle wheel and having an axis, a caliper slidably mounted to the carrier and shaped to straddle the rotor, and a pair of inboard and outboard pad assemblies adapted for operative braking coaction with the rotor, said carrier including a pair of opposite side members extending along the axis of the rotor and each having a pair of guide grooves, said pad spring comprising:

at least one spring member including a pad guide adapted to be received in one of the guide grooves of one the side members, said pad guide having a top wall, bottom wall and a substantially vertical wall extending between said top and bottom walls, said pad guide further including a locking member extending from said vertical wall and terminating below said bottom wall, said locking member being shaped so as to be lockingly engageable within one of the guide grooves.

12. The pad spring according to claim 11, wherein said locking member has a proximal end located at said vertical wall, and a distal end located below said bottom wall, said locking member being generally outwardly curved from said proximal end toward said distal end so as to develop a bias in a direction substantially radially of the rotor.

13. A disk brake comprising:

a carrier adapted to be secured to a fixed part of a vehicle;

a rotor adapted to be fixed to a vehicle wheel;

a caliper slidably mounted to said carrier and shaped to straddle said rotor;

a pair of inboard and outboard pad assemblies adapted for operative braking coaction with said rotor; and a pair of pad springs adapted to slidably support said inboard and outboard pad assemblies, said carrier including an inboard member, an outboard member, and a pair of opposite side members extending between said inboard and outboard members, said pair of side members each having a pair of opposite guide grooves, and a pair of opposite rotor spanning walls extending from said pair of guide grooves and shaped to straddle said rotor, said pair of guide grooves having a substantially C-shaped section, each of said pad springs including a bridge portion having opposite ends and extending along a corresponding one of said pair of side members, and a pair of legs depending from said opposite ends of said bridge portion, each of said legs including a pad guide having a substantially C-shaped section and received in one of said guide grooves of one of said side members, said paid guide having a top wall, a bottom wall and a substantially vertical wall extending between said top and bottom walls and including a locking member extending from said vertical wall and terminating above said top wall, said locking member being shaped so as to engage within a corresponding one of said guide grooves.

14. The disk brake according to claim 13, wherein said pad guide further includes a retaining tab projecting rearwardly from said vertical wall of said pad guide into engagement with one of said rotor spanning walls.

15. A disk brake comprising:

a carrier adapted to be secured to a fixed part of a vehicle;

a rotor adapted to be fixed to a vehicle wheel;

a caliper slidably mounted to said carrier and shaped to straddle said rotor;

a pair of inboard and outboard pad assemblies adapted for operative braking coaction with said rotor; and a pair of pad springs adapted to slidably support said inboard and outboard pad assemblies, said carrier including an inboard member, an outboard member, and a pair of opposite side members extending between said inboard and outboard members, each of said side members having a pair of opposite guide grooves, and a pair of opposite rotor spanning walls extending from said pair of guide grooves and shaped to straddle said rotor, each of said guide grooves having a substantially C-shaped section, each of said pad springs including a bridge portion having opposite ends and extending along a corresponding one of said side members, and a pair of legs depending from said opposite ends of said bridge portion, each of said legs including a pad guide having a substantially C-shaped section and received in one of said guide grooves of one of said-side members, said pad guide having a top wall, a bottom wall and a substantially vertical wall extending between said top and bottom walls and including a locking member extending from said vertical wall and terminating below said bottom wall, said locking member being shaped so as to engage within a corresponding one of said pair of guide grooves.

16. The disk brake according to claim 15, wherein said pad guide further includes a retaining tab projecting rearwardly from said vertical wall of said pad guide into engagement with one of said rotor spanning walls.

17. A pad spring adapted for use with a disk brake including a carrier secured to a fixed part of a vehicle, a rotor fixed to a vehicle wheel and having an axis, a caliper slidably mounted to the carrier and shaped to straddle the rotor, and a pair of inboard and outboard pad assemblies adapted for operative braking coaction with the rotor, the carrier including a pair of opposite side members extending along the axis of the rotor and each of the side members having a pair of guide grooves, said pad spring comprising:

a bridge portion for extending along a corresponding one of the side members of the carrier, said bridge portion having opposite ends;

a first leg depending from one of said opposite ends of said bridge portion; and a second leg depending from the other of said opposite ends of said bridge portion, each of said first and second legs including a pad guide adapted to be received in one of the guide grooves of one of the side members, said pad guide having a top wall, a bottom wall and a substantially vertical wall extending between said top and bottom walls, said pad guide further including a locking member extending from said vertical wall and terminating above said top wall, wherein said locking member is shaped so as to be lockingly engageable within one of the guide grooves.

18. The pad spring according to claim 17, wherein said pad guide further includes a retaining tab projecting rearwardly from said vertical wall of said pad guide.

19. A pad spring adapted for use with a disk brake including a carrier secured to a fixed part of a vehicle, a rotor fixed to a vehicle wheel and having an axis, a caliper slidably mounted to the carrier and shaped to straddle the rotor, and a pair of inboard and outboard pad assemblies adapted for operative braking coaction with the rotor, the carrier including a pair of opposite side members extending along the axis of the rotor and each of the side members having a pair of guide grooves, said pad spring comprising:

a bridge portion for extending along a corresponding one of the side members of the carrier and having opposite ends; and a pair of legs depending from said opposite ends of said bridge portion, each of said legs including a pad guide adapted to be received in one of the guide grooves of one of the side members, said pad guide having a top wall, a bottom wall and a substantially vertical wall extending between said top and bottom walls, said pad guide further including a locking member extending from said vertical wall and terminating below said bottom wall, wherein said locking member is shaped so as to be lockingly engageable within one of the guide grooves.

20. The pad spring according to claim 19, wherein said pad guide further includes a retaining tab projecting rearwardly from said vertical wall of said pad guide.

* * * * *